Figure 1:
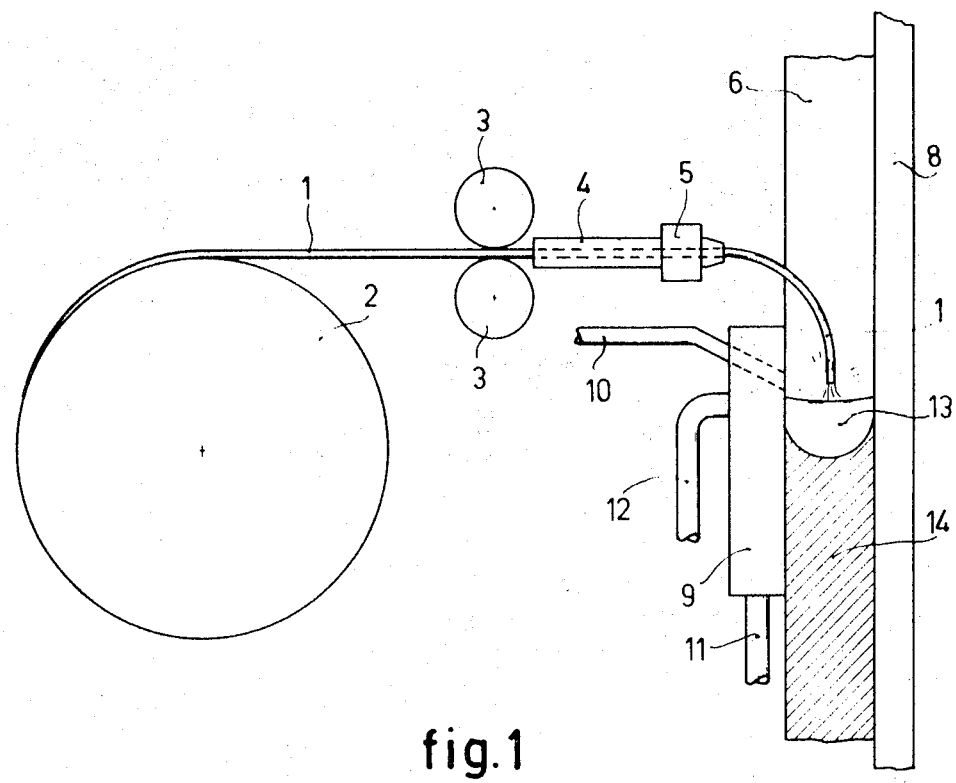

United States Patent

[11] 3,612,817

[72] Inventors Gerrit Willem Tichelaar;
 Johannes Gerardus Verhagen; Gerardus
 Antonius Maria Willems, all of
 Emmasingel, Eindhoven, Netherlands
[21] Appl. No. 876,537
[22] Filed Nov. 13, 1969
[45] Patented Oct. 12, 1971
[73] Assignee U.S. Philips Corporation
 New York, N.Y.
[32] Priority Nov. 16, 1968
[33] Netherlands
[31] 6816388

[54] VERTICAL GAP ARC WELDING
 4 Claims, 2 Drawing Figs.
[52] U.S. Cl. .................................................. 219/126,
 219/73, 219/125 R
[51] Int. Cl. ..................................................... B23k 9/12
[50] Field of Search ........................................... 219/124,
 125 R, 126, 73, 137

[56] References Cited
UNITED STATES PATENTS
2,620,423 12/1952 Komers et al. ................ 219/126
3,024,352 3/1962 Danhier ........................ 219/126
3,193,660 7/1965 Colinet ......................... 219/126
3,296,412 1/1967 Waite et al. ................... 219/73 X
3,303,321 2/1967 Harmsen et al. ............... 219/126
3,382,344 5/1968 Hasegawe ..................... 219/126

Primary Examiner—J. V. Truhe
Assistant Examiner—L. A. Schutzman
Attorney—Frank R. Trifari ABSTRACT: A method and a device for vertical electric arc welding, particularly in a narrow gap. The contact member is located outside the gap, and the welding wire is curved from its source to be directed substantially vertically into the molten pool.

*INVENTORS*
GERRIT W. TICHELAAR
JOHANNES G. VERHAGEN
GERARDUS A.M. WILLEMS

BY
AGENT

VERTICAL GAP ARC WELDING

The invention relates to a method of and a device for vertical electric arc welding in which an electric wire (the end of which can be moved in a horizontal plane and which is fed in a protective gas atmosphere into the space between workpieces) is caused to melt by a welding arc, and in which unsolidified metal is prevented from flowing away laterally from this space by auxiliary pieces often consisting of copper and following the level of the molten metal.

This welding method known from Welding and Metal Fabrication 26 (1958) 8, page 289 which may be referred to as enclosed welding in a protective gas, can be used for joining workpieces by filling seams in a single run, which seams have cross sections of divergent shapes particularly I- and V-seams.

When carrying out this method the electrode wire is fed through a contact member serving as a current supply which member is partly provided between the workpieces at a short distance above the molten pool. Then a troublesome heating of the contact member and contamination by sputters take place. In addition, the choice of the distance between the parts to be joined and particularly that of the access gap between these parts is restricted. During experiments which have led to the present invention, it was found that these drawbacks could be obviated to a great extent by maintaining the current-conveying contact member outside the space during welding, which space is bounded by the parts to be joined and the auxiliary pieces and by feeding the electrode wire laterally in a curved state through a gap between the parts.

The invention relates to a method of vertical welding, in which an electrode wire (the end of which is moved in a horizontal plane and which is fed under a protective gas into the space between workpieces) is caused to melt by a welding arc, and in which unsolidified metal is prevented from flowing away laterally from this space by auxiliary pieces, characterized in that the electrode wire is fed through a contact member serving as a current supply and being located outside the said space in a curved state such that the consumable end of the wire can be directed approximately vertically to the molten pool throughout the cross section of said space.

In this case use can sometimes be made of the curvature formed by the wire after it has been dereeled from a coil. The conventional steps in automatic welding methods for stretching the fed electrode wire must then of course be omitted. Generally, however, the wire must be given an additional curvature, so that the wire fed through the access gap into the space in which the welded joint is made can be directed approximately vertically to the melting bath while running free from the enclosure auxiliary piece provided on the side of said space and up to a short distance of this piece without it being necessary to take the length of the wire projecting from the contact member to be so long that the guidance of the wire above the molten pool and the heating of the free wire end give rise to difficulties due to the passage of current. For example, when welding an I-seam between plates, the radius of curvature must be chosen to be at least equal to the thickness of the plate and in practical cases at most 150 mm. such as when welding plates of 10 to 30 mm. thickness.

The thickness of the welding wire must be adapted to the width of the available access gap between the workpieces to be joined. The wire thickness must generally be at least 3 mm. smaller than the width of the gap. Wire which is thinner than 1½ mm. is not suitable on account of the too high electric resistance at the great current intensities to be used. The arc length must be chosen to be at least so great that a sufficient melting of the edges of the workpieces near the auxiliary pieces can take place and that short circuit of the arc is avoided as much as possible.

An advantage of the method according to the invention: compared with the known one is that the contact member is not heated or is only little heated by the radiation of the welding arc; and that it is little contaminated by spatters and that even in case of narrow access gaps of 6 to 10 mm. it is possible to establish welds of a satisfactory quality. In addition, as a result of the large projection length of the electrode wire outside the contact member and the electric resistance depending thereof; a preheating of the wire end is established due to the passage of current which, as is known per se from French patent specification 920.604, leads to an improved welding economy, quicker deposition of welding metal and reduction of the heat-influenced zone in the workpiece. Particularly for narrow welding seams the reduction of this zone is quite considerable on account of the then-occurring great speed at which the level of the deposited metal increases.

The invention furthermore relates to a device which is very suitable for performing the above-described method. As is common practice, this device includes a contact member for feeding electrode wire, a supply for protective gas, and auxiliary pieces which can prevent the flowing away of unsolidified metal, and furthermore means which can given a relative movement, which is adjustable in direction and speed, of said parts with respect to workpieces. The device according to the invention is distinguished from the known devices in that means for establishing a curvature of wire such as bending rollers or stationary pressure members are provided. It is advantageous to form these means in such a manner that the curvature of the wire can be adjusted.

It is alternatively possible to obtain the curvature of the wire in a simple manner with the aid of a curved tubular contact member. For the sake of completeness it is to be noted that methods of automatic electric arc welding in which the contact member for the electrode wire is outside the welding groove have been known for a long time (Schweissen und Schneiden 8 (1957) 2 page 50 etc.). In a recent publication (Welding Journal 48 (1967) 11 page 905) a method and a device are described for horizontal welding in the downhand position of narrow I seams in a protective gas atmosphere, wherein the contact member is also maintained outside the welding groove and a large projection length of the electrode wire is used.

In these known methods the curvature of the electrode wire has no positive significance, and even possibly occurring natural curvatures are corrected by stretching so as to facilitate correct directing of the wire relative to the molten pool. However, unlike the above, the curvature of the wire is of essential significance in the present invention so as to obtain a correct, approximately vertical position of the wire relative to the molten pool during vertical enclosed welding.

In order that the invention may be readily carried into effect, an embodiment thereof will now be described in detail by way of example with reference to FIGS. 1 and 2 of the accompanying diagrammatic drawing.

FIG. 1 of the drawing is a diagrammatic elevational view of welding equipment. In this Figure a welding wire 1 is fed from a coil 2 with the aid of rollers 3 through a tubular contact member 4. This contact member accommodates a device 5 in which the welding wire 1 can be given a desired curvature by means of a few bending rollers (not shown in the drawing).

Figure 2:
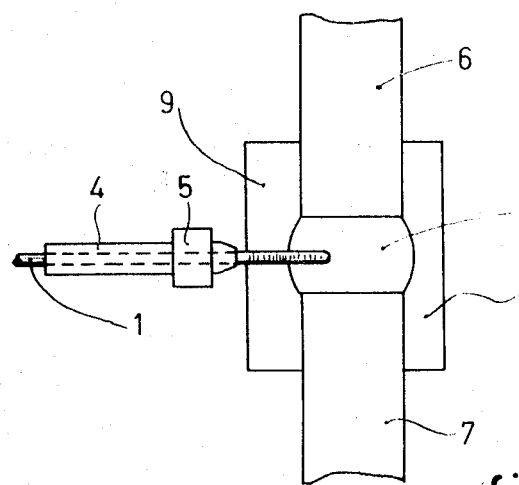

Furthermore this FIG. 1 shows a cross section through the weld between the workpieces, while FIG. 2 is a plan view of part of the arrangement. The respective parts have the same reference numerals in both Figures. The reference numerals 6 and 7 denote two platelike workpieces to be joined by a vertical I-weld. The gap between the plates 6 and 7 is closed by a stationary copper enclosure strip 8 and a movable enclosure block 9 likewise consisting of copper. The enclosure is also shown in a plan view in FIG. 1.

The block 9 is provided with a gas supply 10 for establishing a protective gas atmosphere in the welding area. Furthermore this block is provided with a cavity for water cooling, and supply and drain tubes 11 and 12 for cooling water. The enclosure parts 8 and 9 prevent the lateral flowing away of molten metal from the molten pool 13 above the weld 14. Finally means (not shown in the drawing) are present to move the supply of the electrode wire and the enclosure block 9 upwards as the level of the molten pool rises.

The following table I gives examples of welding according to the invention. Additionally it is to be noted that the protective gas is fed at a speed of 20 litres per minute into the welding groove. In the table the used electrode wires are denoted as types a and b. Wire a is a solid steel wire which comprises 1.8 percent of manganum, 0.8 percent of silicon and 0.1 percent of carbon. Wire b is an electrode wire consisting of a casting of steel strip bent to a tubular form in known manner and having a core which comprises calcium carbonate and calcium fluoride such that the composition of the wire is 2½ percent of $CaCO_3$, 1 percent of $CaF_2$, 1.8 percent of Mn, 0.8 percent of Si, 0.1 of C, remainder iron. The last column of the table includes the speed (in centimeter per minute) at which the welding level rises for different examples. As is common practice, the end of the electrode wire was moved across the gap over the molten pool during welding.

The obtained welding results were very satisfactory. The welds had an elegant appearance. Also penetration was sufficient so that a full wetting of the metal up to the edges of the welded plates was obtained.

To get a further impression of the welding results, the following table II states the notch-impact strength for the examples 10, 16 and 17 in the weld at different temperatures with reference to several measurements.

Table III finally states measurements of the notch-impact strength in the plate material at different distances from the fusion line in the welded joint according to example 10. It appears therefrom that the zone influenced by heat in the welded plates is small.

The notch-impact strength has been measured according to Charpy on trial rods of 10×10×55 mm. having a V-notch of a depth of 2 mm. The angle of the V-notch was 45° and the radius of curvature was 0.25 mm. The values are indicated in kg. per sq. cm.

| No. | Plate material Thickness in mm. | Plate material Quality | Seam Shape | Seam Width in mm. | Electrode wire Type | Electrode wire Diameter in mm. | Electrode wire Projection length in mm. | Electrode wire Radius of curvature in mm. | Gas | Welding current in amps. | Welding voltage in V | Electrode polarity | Rising speed in cm./min |
|---|---|---|---|---|---|---|---|---|---|---|---|---|---|
| 1 | 26 | St 37 | I | 8 | a | 2.5 | 75 | 120 | $CO_2$ | 400 | 38 | — | |
| 2 | 12 | St 37 | I | 6 | b | 2.0 | 30 | 80 | $CO_2$ | 280 | 30 | — | |
| 3 | 26 | St 37 | I | 6 | b | 2.0 | 60 | 100 | $CO_2$ | 280 | 30 | — | |
| 4 | 26 | St 37 | I | 6 | a | 2.5 | 60 | 100 | $CO_2$ | 400 | 36 | — | 16 |
| 5 | 26 | St 37 | I | 8.5 | a | 2.5 | 60 | 100 | $CO_2$ | 400 | 36 | — | 11.5 |
| 6 | 26 | St 37 | I | 6 | b | 2.0 | 60 | 100 | $CO_2$ | 390 | 34 | — | 18 |
| 7 | 26 | St 37 | I | 6 | b | 2.0 | 60 | 100 | $CO_2$ | 450 | 36 | — | 19 |
| 8 | 26 | St 37 | I | 7 | b | 2.0 | 60 | 100 | $CO_2$ | 400 | 36 | + | 14 |
| 9 | 26 | St 37 | I | 7 | b | 2.4 | 70 | 120 | $CO_2$ | 350 | 30 | + | 9 |
| 10 | 26 | St 41 | I | 7 | b | 2.2 | 65 | 100 | $CO_2$ | 340 | 30 | + | 9 |
| 11 | 26 | St 37 | I | 9 | b | 2.2 | 65 | 100 | $CO_2$ | 330 | 28 | — | |
| 12 | 26 | St 37 | V5° | 5–8 | b | 1.8 | 60 | 100 | $CO_2$ | 200 | 30 | — | |
| 13 | 26 | St 37 | V5° | 5–8 | b | 1.8 | 60 | 100 | $CO_2$ | 340 | 33 | — | 14 |
| 14 | 26 | St 37 | I | 7.5 | b | 1.8 | 50 | 80 | $CO_2$ | 360 | 32 | — | 18 |
| 15 | 26 | St 37 | I | 13 | a | 2.5 | 60 | 100 | $CO_2$ | 400 | 36 | — | 7 |
| 16 | 19 | St 52 | I | 7 | b | 1.8 | 50 | 80 | $CO_2$ | 280 | 30 | — | 13 |
| 17 | 26 | St 41 | I | 7 | b | 1.8 | 50 | 80 | $CO_2$ | 280 | 30 | — | 9 |
| 18 | 26 | St 37 | I | 10 | b | 2.2 | 50 | 80 | A | 350 | 27 | + | 6 |
| 19 | 26 | St 37 | I | 10 | a | 2.0 | 50 | 80 | A | 220 | 22 | + | 5 |
| 20 | 26 | St 37 | I | 10 | a | 2.0 | 50 | 80 | A | 320 | 26 | + | 19 |
| 21 | 26 | St 37 | I | 10 | a | 2.0 | 50 | 80 | A | 400 | 30 | + | 2 |
| 22 | 26 | St 37 | V45° | 6–24 | a | 2.0 | 50 | 80 | $CO_2$ | 460 | 37 | + | 7 |
| 23 | 26 | St 37 | I | 10 | b | 2.2 | 50 | 80 | (*) | 240 | 24 | + | 16 |
| 24 | 26 | St 37 | I | 10 | b | 2.2 | 50 | 80 | (*) | 400 | 36 | + | 0 |
| 25 | 26 | St 37 | I | 10 | b | 2.2 | 50 | 80 | He | 400 | 35 | + | 9 |
| 26 | 26 | St 37 | I | 10 | b | 2.2 | 50 | 80 | He | 220 | 22 | + | 3 |

*80A+15$CO_2$+5$O_2$.

TABLE II
Notch-impact strength of the weld in kg./sq. cm.

| Temperature, °C. | Example Number 10 | Example Number 16 | Example Number 17 |
|---|---|---|---|
| −40 | | 2.9 | 4.4 |
| | | 3.9 | |
| | | 5.9 | |
| −20 | 7.7 | 6.1 | 5.1 |
| | 5.5 | 5.1 | 7.7 |
| | 9.0 | 6.7 | |
| 0 | 12.5 | 6.7 | 11.7 |
| | 14.5 | 7.2 | |
| | 16.0 | 8.0 | |
| +20 | | 10.0 | 14.5 |
| | | 10.1 | 15.2 |
| | | 11.2 | 19.4 |
| +90 | | 12.7 | |
| | | 13.9 | |

TABLE III
Notch-impact strength in kg./sq. cm. in the plate material measures at different distances from the fusion line.

| Temperature, °C. | Distance, mm. 1 | 2 | 3 | 5 | 10 |
|---|---|---|---|---|---|
| −20 | 5.2 | 15.7 | 15.9 | 17.5 | 10.6 |
| | 13.2 | 10.1 | 15.6 | 12.0 | 8.7 |
| | 4.6 | 13.4 | 16.0 | 13.7 | 11.5 |
| 0 | 16.9 | 16.2 | 18.2 | 17.2 | 16.1 |
| | 4.4 | 17.6 | 17.6 | 16.1 | 16.5 |
| | 15.4 | 17.7 | 16.2 | 16.9 | 16.1 |

What is claimed is:

1. A method of vertical electric arc welding for joining two workpieces having between them a gap with an access width in the range of 6 to 10 mm., and using electrode wire having thickness of at least 1.5 mm. but at least 3 mm. less than the access width of the gap, comprising the steps of feeding the wire generally horizontally to a contact member located remote from the gap, and then forming the wire into an arc having a maximum radius of 15 cm., and feeding the end of the wire from the curve generally vertically into the gap, and blocking unsolidified metal from flowing out of the space by placing auxiliary pieces adjacent said gap, and maintaining a welding arc between the wire and workpieces.

2. A method according to claim 1 wherein an arc is formed in the wire by feeding same through a pair of cooperating spaced rollers.

3. A method according to claim 1 wherein blocking comprises placing a stationary auxiliary piece adjacent one side of said gap, and moving a second auxiliary piece adjacent the opposite side of the gap, in the vicinity of the unsolidified metal.

4. A method according to claim 3 comprising cooling the second auxiliary block by flowing a coolant therethrough.